United States Patent

[11] 3,620,565

| [72] | Inventors | Walter S. Eggert, Jr.<br>Huntingdon Valley;<br>James M. Herring, Jr., Merion Station, both of Pa. |
|---|---|---|
| [21] | Appl. No. | 867,048 |
| [22] | Filed | Oct. 16, 1969 |
| [45] | Patented | Nov. 16, 1971 |
| [73] | Assignee | Boothe Airside Services, Inc. |

[54] AIRCRAFT PASSENGER TRANSFER VEHICLE
5 Claims, 6 Drawing Figs.

[52] U.S. Cl. .................................................. 296/28 A, 187/24, 214/512
[51] Int. Cl. .............................................. B62d 31/02
[50] Field of Search ......................................... 296/28 A, 28 R; 214/512; 187/24, 25

[56] References Cited
UNITED STATES PATENTS

| 1,522,967 | 1/1925 | Meyer et al. | 187/24 |
| 2,652,783 | 9/1953 | Skinner | 187/24 X |
| 2,778,674 | 1/1957 | Attendu | 296/28 A |
| 3,537,745 | 11/1970 | Herring | 296/28 A |

FOREIGN PATENTS

| 558,425 | 6/1957 | Belgium | 296/28 A |
| 923,554 | 7/1947 | France | 296/28 A |

Primary Examiner—Benjamin Hersh
Assistant Examiner—John A. Pekar
Attorney—Stowell & Stowell ABSTRACT: A vehicle to transfer passengers between a terminal building and parked aircraft. The vehicle includes a chassis having a main central beam and two upright guide posts at each end. A pod for containing the passengers is mounted for movement on the masts. Lift drive apparatus in the form of screw means suspended from the guide posts and connected to a power source may be driven to raise and lower the pod. Spring means housed in pockets on the chassis at the base of the masts provide suspension for the pod when the same is lowered and the vehicle is driven across the ground surface.

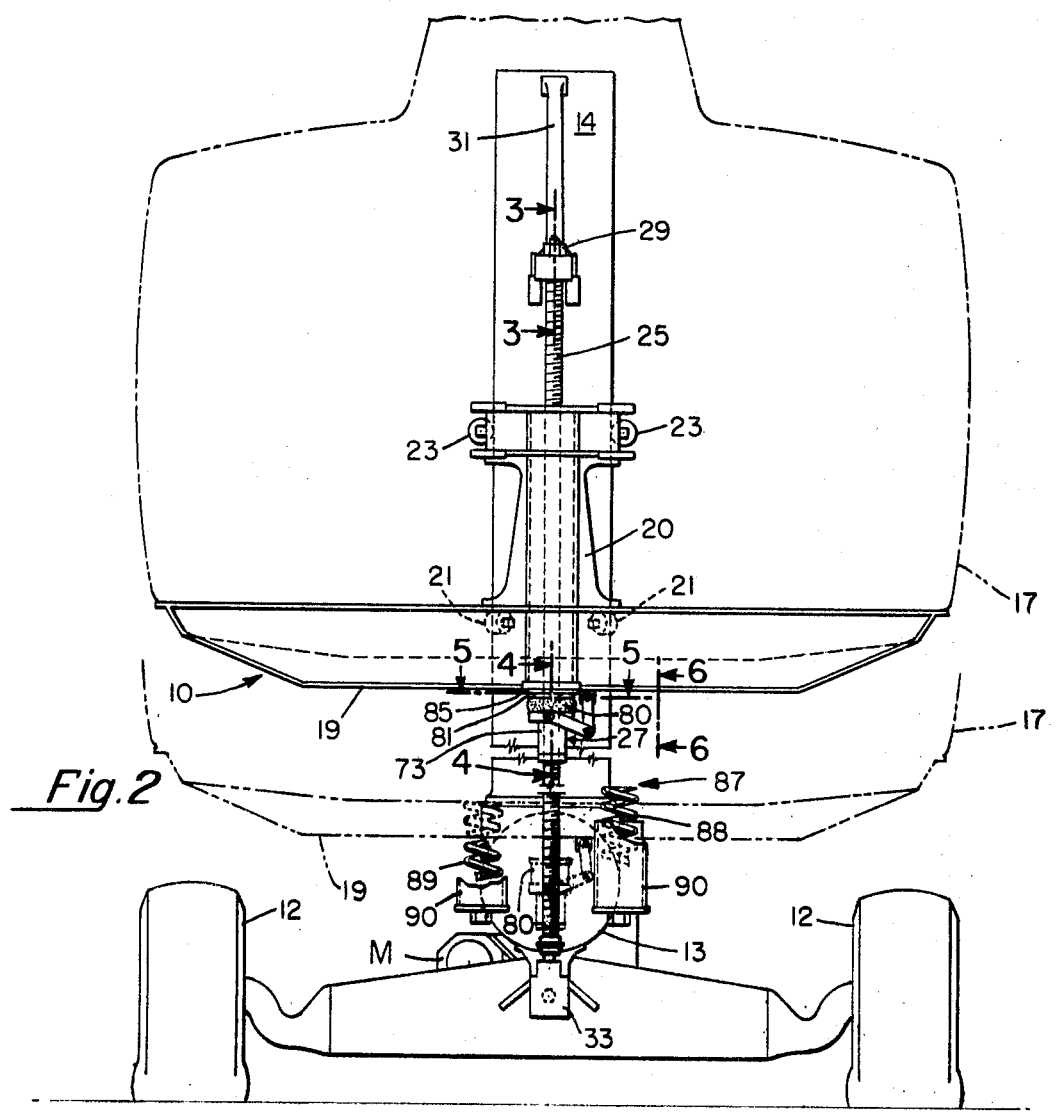
Fig.2
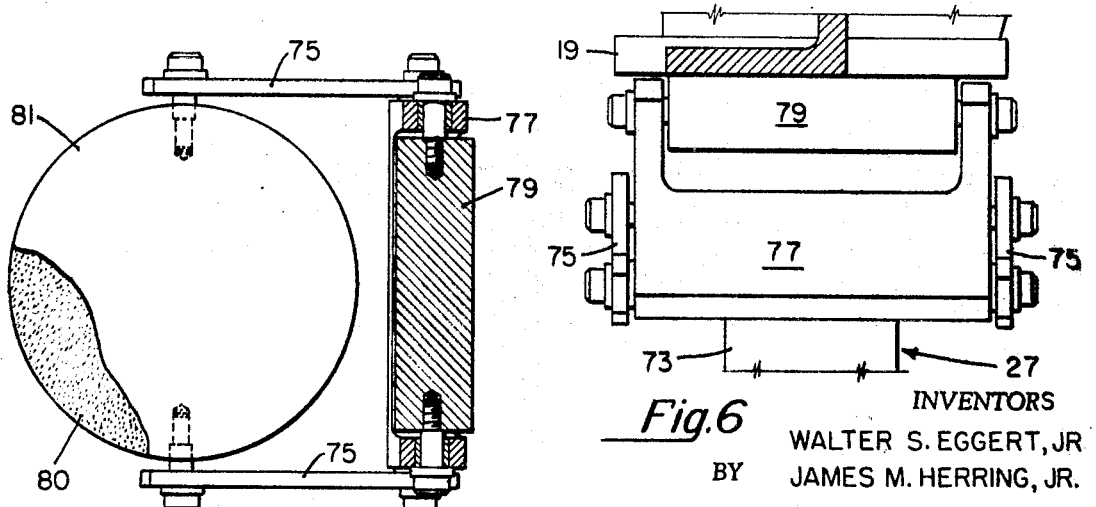
Fig.5
Fig.6
INVENTORS
WALTER S. EGGERT, JR
BY JAMES M. HERRING, JR.
William R. Nolte
AGENT

AIRCRAFT PASSENGER TRANSFER VEHICLE

This invention has utility in the vehicle shown and described in application Ser. No. 762,443, Inventor–James M. Herring, Jr., filed Sept. 25, 1968, now U.S. Pat. No. 3,537,745 entitled "Aircraft Transfer vehicle," and assigned to the same assignee as the present invention. In this application a passenger pod is described as being mounted for up and down lifting movement on a pair of lifting guide posts extending upwardly from the horizontal beam of the chassis. Lifting screws supported in compression at their lower ends on the chassis are driven by a suitable source of power. Nuts secured to the lower frame at the opposite ends of the pod are threaded on the screws. Depending upon the direction of rotation of the screws the pod is raised or lowered by the nuts. Due to the imbalance of loads normally carried by the pod, and the fact that the screws are supported in compression on the chassis frame, the screws are subjected to large buckling forces. Moreover to compensate for such buckling the cross-sectional area of the lifting screws is greatly increased thereby adding excessive weight and cost to the vehicle.

Accordingly it is the principal object of this invention to provide an improved aircraft transfer vehicle having an improved lifting-drive system for elevating and lowering a passenger compartment of a vehicle which avoids one or more of the disadvantages of the prior art.

It is another important object of this invention to provide in a vehicle having a chassis with masts at its opposite ends and a pod movable on said masts, lifting screw means suspended from the top portions of said masts to carry said passenger pod.

In accordance with the invention an aircraft transfer vehicle having a chassis is provided with spaced apart vertical guide posts with a passenger pod movable vertically along the guide posts. Lifting means comprising screw means connected to the posts and to the chassis are operably connected to raise and lower the pod to a plurality of different levels corresponding to aircraft doorway levels and terminal building doorway levels. Spring means are provided at the lower ends of the lifting posts to contact the underfloor surface of the pod to resiliently cushion the pod as the vehicle is propelled across the ground surface.

For a better understanding of the invention taken with other and further objects thereof reference is had to the following description taken in connection with the accompanying drawings.

IN THE DRAWINGS

FIG. 2 is a front-elevational view of the vehicle shown in FIG. 1 partially in section;

FIG. 5 is a sectional view taken along the line 5—5 of FIG. 2 illustrating the linkage for restraining the ball nut against rotation, and FIG. 6 is a view taken along the line 6—6 of FIG. 2.

Figure 1:
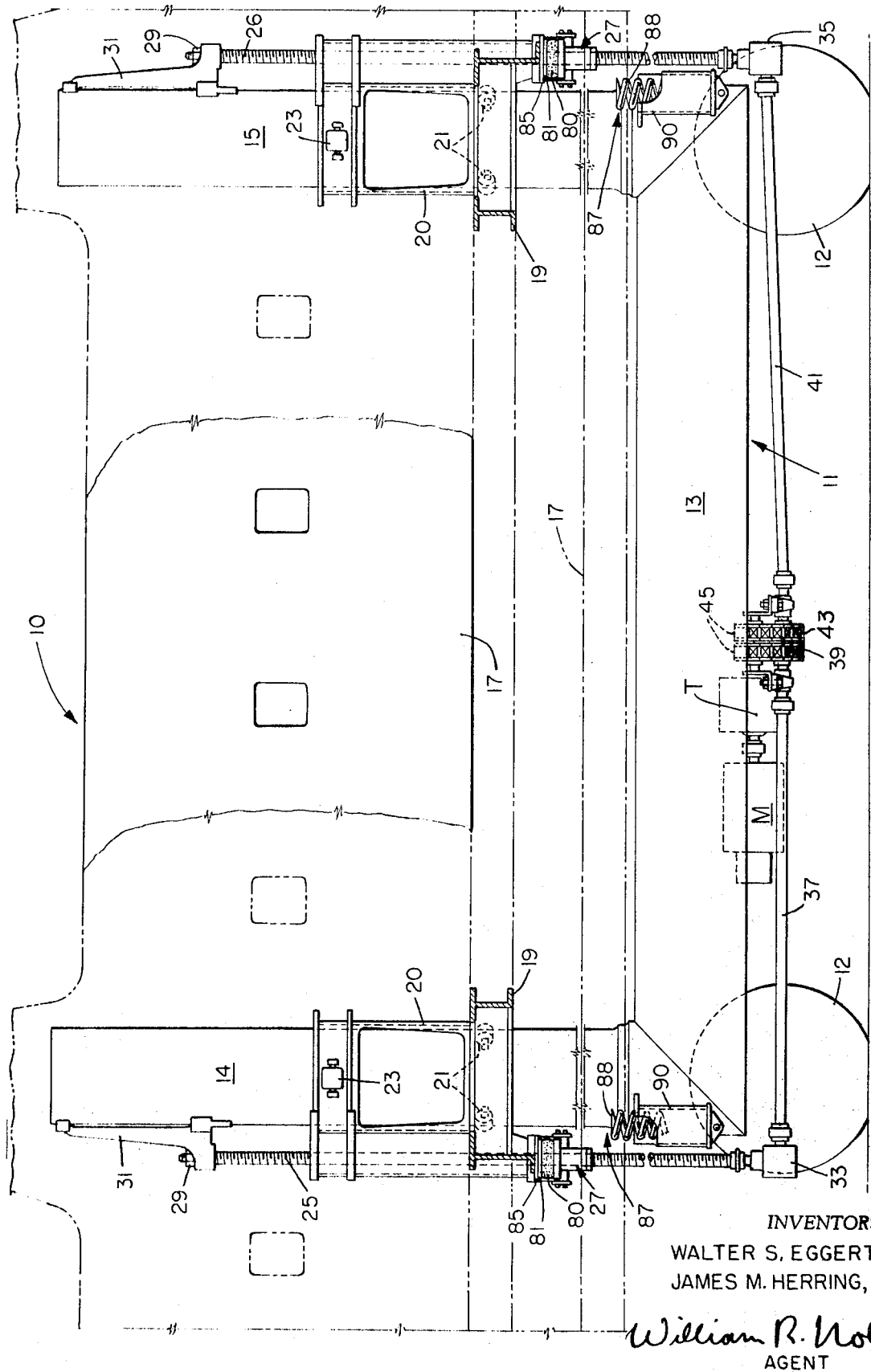
FIG. 1 is a side elevational view of an aircraft passenger transfer vehicle partially in section and with the passenger carrying pod thereof shown in its elevated position.

Referring now to FIGS. 1 and 2 there is shown an aircraft passenger transfer vehicle 10 embodying the lift drive apparatus of the present invention. The vehicle includes a chassis 11 and wheels 12 enabling the vehicle to traverse the ground surface. The chassis includes a main horizontal beam 13 and two vertical masts or guide posts 14, 15 disposed at opposite ends of the beam along the longitudinal center line of the vehicle. The posts guide and provide support for a passenger pod 17. For this purpose the pod includes transverse bolsters 19 having a steel tubular assembly 20 welded thereto. Guide rollers 21, below, and 23 above, supported to the sleeve assembly, bear on the masts 14, 15 and take the transverse loads from the pod and transfer them to the masts. The vertical loads from the pod are taken by fore and aft lift ball screws 25, 26 respectively. Each lift screw passes through bolster 19 and is provided with a ball nut assembly 27 upon which the bolster 19 is supported in one mode of operation. The top end of each ball screw 25, 26 is hung in a thrust bearing assembly 29 which in turn is supported on a bracket 31 affixed at the top of each mast.

Screw 25 is driven through a right angle gear miter box 33 located at the bottom of the forward end of the chassis, while the screw 26 is driven by means of a like right angle box 35. Miter box 33 is driven through a tubular drive shaft 37 with a sprocket 39 affixed at its end away from the box 33, while miter box 35 is similarly driven by shaft 41, having sprocket 43 affixed thereto. A suitable source of power M through a transmission unit T drives roller chains 45 connected to the aforementioned sprockets 39, 43 to provide a constant torque drive to either raise or lower the pod.

Figure 3:
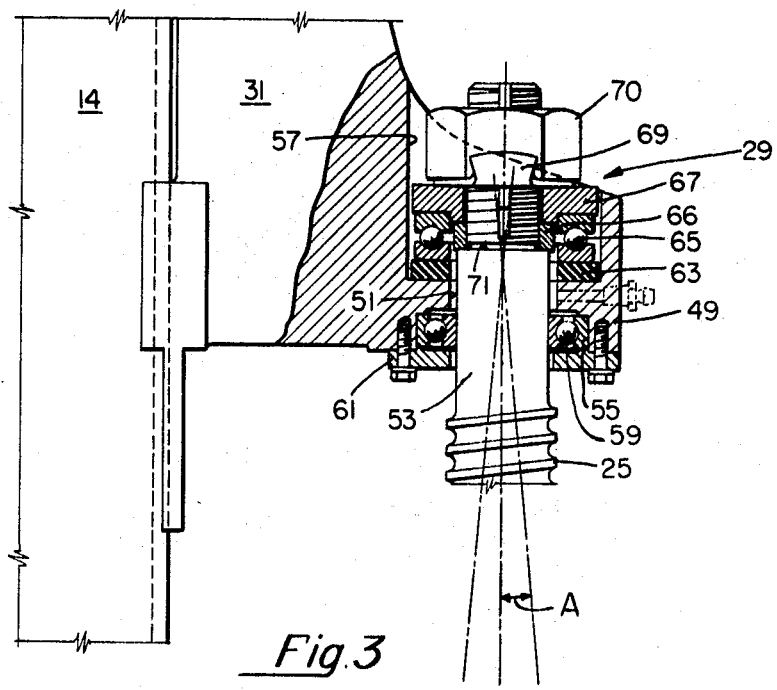
FIG. 3 is a sectional view taken along the line 3—3 of FIG. 2 showing the screw hung on a bracket of the guide post.

With reference now to FIG. 3 the upper end of shaft 25 is shown supported by the aforementioned thrust bearing assembly 29. The bracket 31 includes an arm portion 49 having a vertical opening 51 through which the upper end 53 of shaft 25 extends. The arm portion includes a lower bore portion 55 and an upper bore portion 57 both of larger diameter and concentrically aligned with opening 51. A radial sealed bearing 59 is received within bore 55 and is suitably retained in place by plate 61. A plate of resilient material 63 and thrust bearing 65 are received within upper bore 57. Washer 67, lock washer 69 and nut 70 threaded on the end of shaft 25, are effective to retain the shaft in place on arm 31. It is noted that the resilient ring or plate 63 is effective to equalize the thrust loading of the shaft due to minor angular misalignments through the angle A of the screw 25. Since the screw 25 does not rest on a lower bearing, all of the loads supplied by the pod are such that screw 25 is only subjected to tensile stresses. Spacer bearing 66 is provided between washer 67 and shoulder 71 of screw 25 to provide variation with respect to vertical tolerances.

Figure 4:
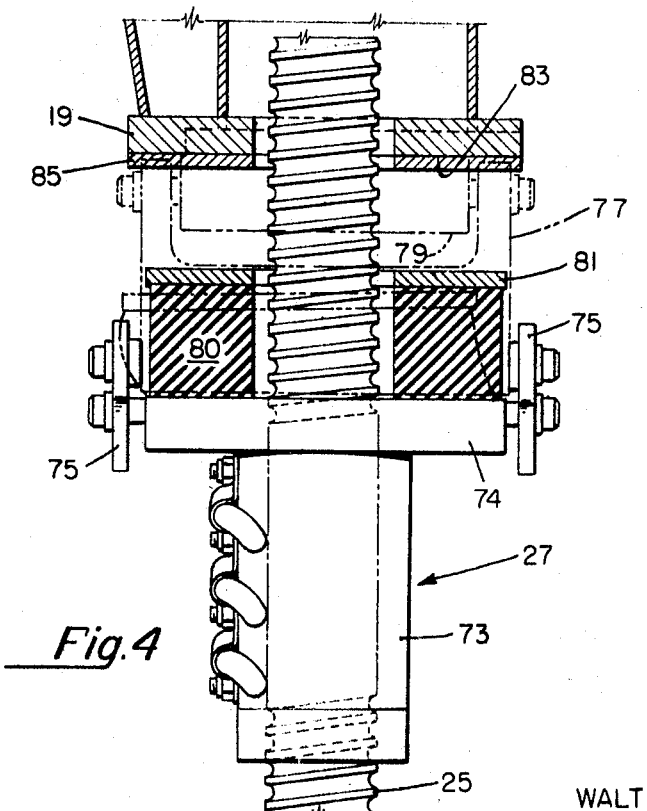
FIG. 4 is a sectional view taken along the line 4—4 of FIG. 2 illustrating the resilient support means interposed between the ball nut and the bolster of the pod.

Referring now to FIGS. 2, 4, 5, 6, but particularly to FIG. 4, it is seen that elongated ball nut includes a lower portion 73 and a top portion 74 of greater diameter than the lower portion. The ball nut 27 is prevented from turning as screw 25 is rotated by means of side links 75 pivotally mounted to opposite sides of the top portion 24, and tongue link 77 pivotally connected at its lower end to the side links 75. The upper end of the tongue link 77, FIG. 6, is pivotally connected to block 79 secured to the bottom surface of bolster 19. With further reference to FIG. 4, a bushnut 80 of resilient material having a thick sheet of polished material 81 such as stainless steel on its top surface is affixed to the top surface of the enlarged top portion 74 of the ball nut 27. Above the sheet 81 and affixed to undersurface 83 of the bolster 19, there is affixed a bearing plate 85 of low-frictional resistance, and which may be in the form of a graphite impregnated sheet. When the ball nut 27 is in pod supporting engagement as illustrated in FIG. 2, in contact with the full line position of bolster 19, the resilient bushnut 80 is deflected and caused to bulge. See also the phantom line position of bushnut 80 in FIG. 3. As the bushnut deflects any slight sliding movement of polished sheet 81 is taken in sliding contact by antifriction plate 85. With the nut 27 in pod supporting engagement the resilient bushnut 79 provides compliance between the screw 25 and the bolster 19. The bushnut being capable of deflecting corrects or compensates for minor alignment errors and precludes overloading the screw 25 in bending. It can thus be seen that with wide variations of passenger loads, wind loads etc., the bushnut at all times provides a resilient mount between the pod and the screw 25.

In another mode of operation of the pod, the load of the pod may be transferred from the lifting screws to the chassis 13 of the vehicle. Still considering FIG. 2, by appropriate rotation of lifting screw 25 the pod including bolster 19 is caused to be moved from its full line position to its phantom line position. Also with such sufficient rotation of shaft 25 the ball nut 27 is caused to separate from the undersurface of bolster 19 as illustrated in the phantom line position of the nut 27. During such separation, the load of the pod is transferred to resilient spring means 87. The latter spring means include a pair of coil springs 88, 89 disposed on opposite transverse sides of the screw 25. Each spring 88, 89 is housed within a suitable cylindrical pocket open at the top and supported at forward end of the chassis 13. In this lowered position of the pod, the vehicle is enabled to transverse the ground surface. Any road shock due to inequalities in the ground surface is absorbed in deflection by coil springs 88, 89.

What is claimed is:

1. An aircraft passenger transfer vehicle of the type adapted to receive and discharge passengers at a plurality of levels, said vehicle having a self-propelled chassis for traversing the ground surface, said chassis including a pair of spaced apart fixed upright guide posts, a passenger pod mounted on said guide posts for vertical movement on said posts, lifting means operably connected between said chassis and said pod for raising and lowering said pod to predetermined elevations, said lifting means including threaded rod means, means securing said threaded rod means to said guide posts, first resilient means interposed between said guide posts and said securing means to enable angular movement of said threaded rod means relative to said lifting posts due to swinging movement of said pod relative to said lifting posts, said lifting means further including nut means axially movable along said threaded rod means for selective engagement and disengagement with said pod, additional resilient means associated with said nut means and interposed between said nut means and said pod means to provide compliance during said selective engagement and disengagement and to accommodate for angular variations of said pod relative to said threaded rod means.

2. In the aircraft passenger transfer vehicle as set forth in claim 1, wherein said pod means include plate means having a low coefficient of friction secured thereto to facilitate sliding engagement of said nut means with said pod.

3. In the aircraft passenger transfer vehicle as set forth in claim 1 and including link means secured to said pod and to said nut means, said link means enabling axial movement of said nut means along the axis of said threaded rod means for said selective engagement and disengagement of said nut means with said pod but preventing rotation of said nut means relative to said pod.

4. In the aircraft passenger transfer vehicle as set forth in claim 3 wherein said link means include first and second link elements pivoted to one another, said first link element being secured to said pod and said second to said nut pivot means connected to the first and second link means.

5. In the aircraft passenger transfer vehicle as set forth in claim 4 wherein said first link element means constitutes a pair of link elements disposed on opposite sides of said nut means, and wherein said second link element means constitute tongue means pivoted at one of its ends to said pair of link elements and at its other end to said pod.

* * * * *